June 19, 1956     KAZUSHIGE MIYAZAKI     2,750,807
SPECIAL INTERNAL ENGAGING GEAR SET
Filed March 6, 1952     2 Sheets-Sheet 1
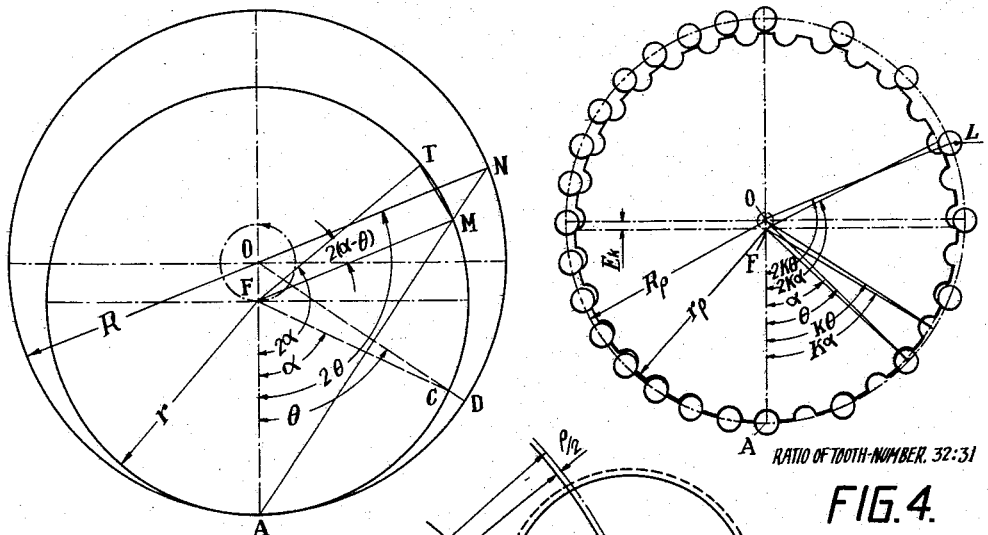
FIG.1.
FIG.4.
RATIO OF TOOTH-NUMBER. 32:31
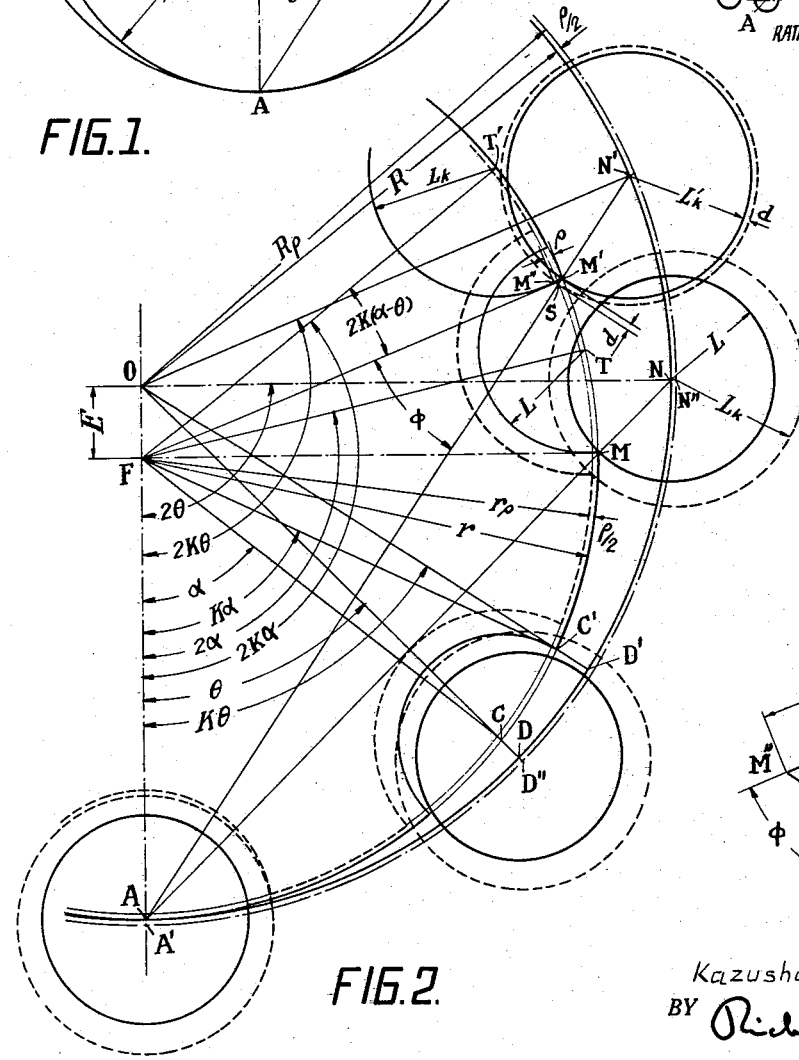
FIG.3.
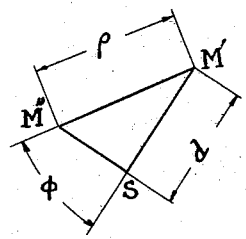
FIG.2.
INVENTOR.
Kazushige Miyazaki
BY
ATTORNEYS.

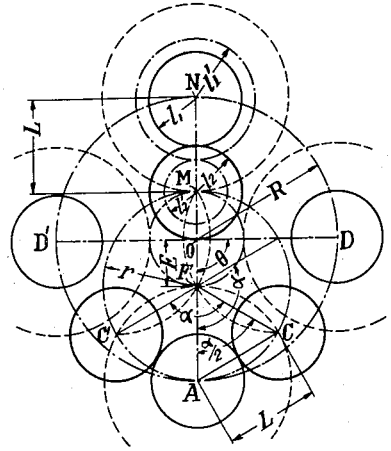
FIG.5.
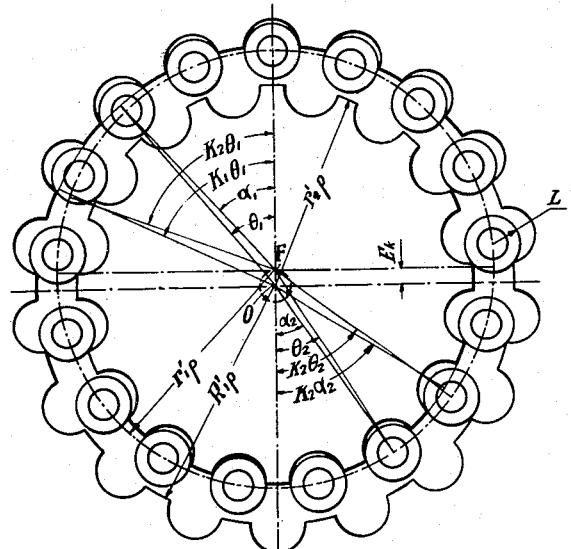
FIG.7. NUMBER OF TEETH. 18, 17, 16
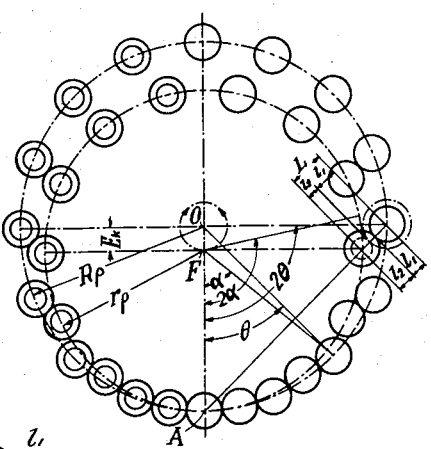
RATIO OF TOOTH-NUMBER. 8 : 7
FIG.6.
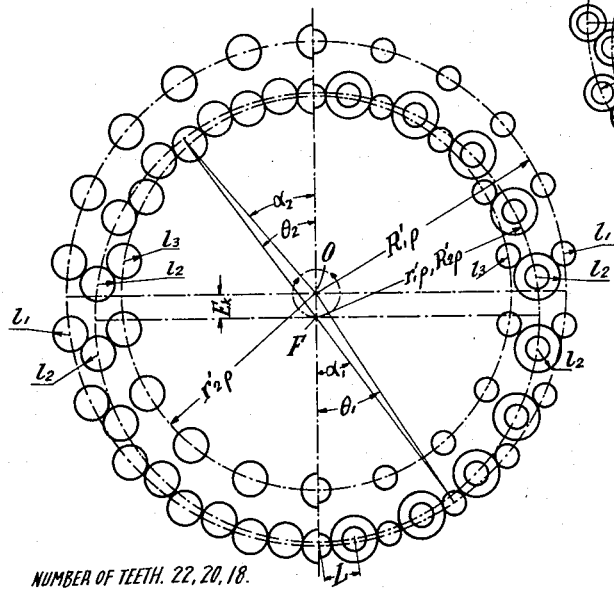
NUMBER OF TEETH. 22, 20, 18.
RATIO. 11 : 10 : 9
FIG.8.
INVENTOR.
Kazushige Miyazaki
BY
ATTORNEYS.

United States Patent Office 2,750,807
Patented June 19, 1956

2,750,807

SPECIAL INTERNAL ENGAGING GEAR SET

Kazushige Miyazaki, Ohta-ku, Tokyo, Japan

Application March 6, 1952, Serial No. 275,181

4 Claims. (Cl. 74—457)

The present invention relates to a method of forming or constructing special internal engaging gear wheels characterized in that the ratios for radii of engaging circles to radius of teeth can be varied at will by improving internal engaging gear wheels, the one of which is formed of circular teeth, while the other of semi-circular ones.

A primary object of the invention is to provide a gear wheel construction of high efficiency, wherein a reasonable balance of strength is maintained in rate of the tooth-size with the tooth-pitch and a freely changeable relation between the teeth and the engagement is obtained.

Another object of the present invention is to provide the teeth of the internally engaging gear wheels which can be manufactured by a simple manner without necessitating special machine tool and is favourable for heat treatment, so that the teeth for high power, large diameters and large reduction gears may be readily produced.

A further object is to provide a highly efficient gear wheel of considerably low slip in both gear wheels during engaging and consequently of low friction loss.

Other objects, features and advantages of the present invention will be apparent from the following detailed descriptions.

Hitherto, such gear wheels, as a rule, have been formed of special curved teeth, and the tooth-form thereof is shaped by an involute or cycloid curve to ensure a firm gear revolution.

The special internal engaging gears according to the invention is characterized by the fact that the gear wheels are constructed on a basically different principle from the conventional wheels and the teeth are shaped in simple circles, whereby in this internal gearing the locus of revolving contact points of the inscribed gear wheel draws an approximate hypo-cycloid curve, so that the elements which enable the gear rotation by its peculiar movement, i. e. radii of engaging circles, diameter of the tooth and all other factors can be determined with mathematical equations.

Now, comparing the foregoing two methods with each other, in the former a gear rotation is enabled by the teeth shaped in curve, while on the contrary, the latter has simple circular teeth instead of special curved teeth, and a favourable gear rotation of the gear wheels is ensured by transforming the special curve of the former teeth into a curvilinear movement. As a result, the curve cutting work by the cutting machine may be substituted with mathematical calculations. Thus, the motional rotation gearing method entirely different from the usual method of gear cutting has been established.

According to the invention, any desirable radii of engaging circles are obtainable for the same size of tooth depending upon the choice of the coefficient in the equation of gear-formation. In other words, the pitch can be varied in various ways. Appropriate values for the coefficient can be determined by a calculator in accordance with the conditions such as the number of revolutions, the magnitude of load or the speed reduction ratio and the like. Thus, the present method is of great adaptability, and in this method for forming gears the teeth of both conjugating wheels can be formed in circles.

Moreover, the difference in the tooth-number or ratio of tooth-number between the inner and outer gear wheels can always be made one, so that the tooth-number or ratio of tooth-number equals the speed reduction ratio. Therefore, the reduction of about one-seventieth may be achieved in one unit, with the minimum number of teeth and with the maximum speed reduction through the mechanism of the minimum space. Moreover, both axes of a higher and a lower velocity can be concentrically constructed. Thus, there is obtained the reduction gear which even in high speed running driven by a directly coupled electric motor can operate substantially without noise.

In order that the present invention may be more clearly understood, the forms thereof will now be described by way of an example and with reference to the accompanying drawings, in which:

Figures 1 to 3 demonstrate diagrammatically the principle, on which the present invention is based; and Figures 4 to 8 illustrate diagrammatically the embodiments of the invention.

Referring now to the drawings, in the Fig. 1, a circle (R), the center of which is (0), and another circle (r), the center of which is (F), contact with each other at a point (A). Point (A) is connected with an arbitrary point (N) by a straight line and the intersecting point of the line with the circle (r) is designated (M). Then, let the middle point of $(\overline{AN})$ be (D), the intersecting point of a straight line $(\overline{OD})$ with circle (r) be (C), $(\overline{CT})$ be equal to $(\overline{AC})$, then $$\overset{\frown}{MFT}=2(\alpha-\theta)$$

where $\overset{\frown}{AOD}=\theta$, $\overset{\frown}{AON}=2\theta$, $\overset{\frown}{AFC}=\alpha$, $\overset{\frown}{AFT}=2\alpha$. Let $(\overline{MN})$ be a normal to a hypo-cycloid curve, whose generating point is a point (M) on a circle (r), while $(\overline{MN})$ and $(\overline{MT})$ be as below:

$$\overline{MN}=2(R-r)\sin\theta$$

$$\overline{MT}=2r.\sin(\alpha-\theta)$$

then a relationship is established between (R) and (r) as follows:

$$R\sin\theta=r(\sin\theta+\sin(\alpha-\theta)) \qquad (1)$$

Based upon the foregoing stand the present inventor has invented a mechanism for internally engaging gear wheels, as disclosed in the Japan Patent No. 159,123, granted of August 25, in 1943. In this patented invention, (R), (r) and (L) are so determined that (L), radius of tooth, may satisfy the formula as follows:

$$L=2R\sin\theta\left(1-\frac{\sin\theta}{\sin\theta+\sin(\alpha-\theta)}\right) \qquad (2)$$

when (R) and (r) in the Formula 1 represent the radius of a pitch circle (radius of engaging circle) for outer and inner circles respectively, (N) and (n) represent their tooth-numbers respectively and ($\theta$) and ($\alpha$) represent the dividing angles of their teeth respectively. Thus obtained (L) is the largest tooth for given (R) and (r), and it is unable to provide a tooth larger than this one (L).

Hence, in the above-mentioned invention, the relation between (L), tooth-radius, (R) and (r), radii of engaging circles is constant. So the size of teeth is not always appropriate for the tooth-pitch. From the view point of strength-balance, in except of certain special cases, especially for increased number of teeth to be constructed, the balance becomes worse due to the enlarged tooth-pitch. With a result, it is feared that the mechanism itself tends to increase.

The present invention is aiming at the improvement to remove the above disadvantages, and enables to reach the balance of strength between the size and pitch of teeth by correcting the radii of engaging circles using a suitable and very adaptable correcting factor. In addition to this, the teeth for both inner and outer gears can be made in circular shapes. Besides, the present invention is to construct a novel internal engaging gear wheel characterized by the fact that it can be constructed in such a manner that one gear wheel eccentrically disposed on a plane in the middle between two wheels concentrically arranged is capable of engaging with two wheels at the same time.

In the Fig. 2, the foregoing two Formulas 1 and 2 are likewise held true among (N), (n), (R), (r), (L), ($\theta$) and ($\alpha$). Suppose let new teeth be disposed at the positions (N') and (T') of the engaging circles with radii (R) and (r), then the positions (N') and (T') will be such that the angle between (N'O) line and (AO) line is (2K$\theta$), while (T') stands at a position (2K$\alpha$), where (K) is taken as coefficient. Connecting the points (N') and (A), and the intersecting point of thus formed line with circle (r) being designated (M'), and then connecting (F) and (M'), (M'$\hat{F}$T') will be shown as below:

$$M'\hat{F}T' = 2K\alpha - 2K\theta = 2K(\alpha - \theta)$$

Now, let $\overline{M'T'} = L_k, \overline{M'N'} = L'_k$, and the eccentricity of circles (R) and (r) be (E), then $$L_k = 2r \sin K(\alpha - \theta) \quad (3)$$

$$L'_k = 2(R-r) \sin K\theta = 2E \sin K\theta \quad (4)$$

However, since (R) and (r) have been determined by putting ($\alpha$) and ($\theta$) as dividing angles in the Formula 1, $$L_k \neq L'_k$$

Above two values can be made equal by multiplying tooth-radius (L) by (K).
Radius (L) being given by $$L = 2(R-r) \sin \theta \quad (5)$$
$$= 2r \cdot \sin (\alpha - \theta) \quad (6)$$

So, multiplying Formulas 5 and 6 by (K), $$KL = 2Kr \cdot \sin (\alpha - \theta) \quad (7.1)$$
$$= 2K(R-r) \sin \theta \quad (7.2)$$

This indicates that the teeth radii can be made only equal to each other. The positions of these teeth do not coincide with N' of 2K and T' of 2K represented by Formulae 3 and 4, respectively. Consequently the teeth are in such a position that they cannot interengage. This is apparent from the difference between the Formulae 3 and 7.1 and between the Formulae 4 and 7.2. When Formula 3 with Formula 7 and Formula 4 with Formula 7 are compared, those differences obtained are due to the difference between (sin $K\theta$) and ($K$ sin $\theta$) and to that between (sin $K(\alpha-\theta)$) and ($K$ sin ($\alpha-\theta$)). Now let those ratios be respectively (C) and (C'), then $$C = \frac{K \sin \theta}{\sin K\theta} \quad (8)$$

$$C' = \frac{K \sin (\alpha - \theta)}{\sin K (\alpha - \theta)} \quad (9)$$

In the Formula 9, numerical values of (C') is exceedingly small for number of teeth in the domain where teeth are to be formed. Therefore, in the construction of teeth, it is safely assumable that:

$$C' = \frac{K \sin (\alpha - \theta)}{\sin K (\alpha - \theta)} \approx 1$$

So for the sake of simplicity of calculation, (C') can be neglected. Hence, the Formulas 3 and 7 are as follows:

$$2r \sin K(\alpha - \theta) \approx 2rK \sin (\alpha - \theta)$$
$$= L_k = K \cdot L \quad (10)$$

Then, multiplying Formula 4 by (C) to make Formulas 4 and 7.1 equal to each other, then $$CL'_k = 2C(R-r) \sin K\theta = L_k \quad (11)$$

and the size and position of teeth become equal. As $(R-r)$ is eccentricity (E), the relationship between tooth radii ($L_k$) and ($L'_k$) becomes:

$$L_k = 2(R-r) \frac{K \sin \theta}{\sin K\theta} \cdot \sin K\theta$$
$$= 2(R-r)K \sin \theta = 2EK \sin \theta$$
$$= K \cdot L \quad (12)$$

(K) in the Formula 12 is the correction factor, and $$K = \frac{L_k}{L} \quad (I)$$

The correction factor (K) is a ratio of tooth-radius ($L_k$) for the teeth to be formed anew to the tooth-radius (L) determined by the Formula 2.

Thus teeth having the radius LK are provided at the point N'. However, since the teeth which can be provided at point N' have the radius $L'_k$ of the Formula 4 is is apparent from the above that there is a disadvantage when the radii of engaging circles remain R and r. At the position (N'), the teeth for ($L_k$) are to be formed. The radii of engaging circles of (R) and (r) are not suitable for the present purpose.

Let
$$L_k - L'_k = d,$$
then
$$d = L'_k C - L'_k = L'_k (C-1) \quad (13)$$

(d) is (M'S) on the line (AM'N') in Fig. 2. Now let the angle (AM'F) be ($\phi$), and in the triangle (M'SM'') of Fig. 3 showing this portion enlarged, $$M'\hat{S}M'' = \hat{R}$$

$$\overline{M'M''} = \rho$$

then ($\rho$) becomes the correction-difference. The angle ($\phi$) is given as below:

$$\hat{\phi} = \frac{180° - 2K\theta}{2}$$

$$= 90° - K\theta$$

The correction-difference =

$$\rho = \frac{d}{\cos \phi}$$
$$= \frac{d}{\cos (90° - K\theta)}$$
$$= \frac{d}{\cos 90° \cdot \cos K\theta + \sin 90° \cdot \sin K\theta}$$
$$= \frac{d}{\sin K\theta}$$
$$= \frac{L'_k (C-1)}{\sin K\theta}$$
$$= 2E\left(\frac{K \cdot \sin \theta}{\sin K\theta} - 1\right) \quad (II)$$

The correction-difference ($\rho$) is to be corrected evenly among radii of engaging circles (R) and (r). Now let the radii of engaging circles corrected with ($\rho$) be ($R\rho$) and ($r\rho$) respectively, the radii ($L_k$) of teeth, corrected with the correction factor (K), to engage with the above radii of engaging circles, can be given by the following formulas:

$$L_k = 2KR \sin \theta \left(1 - \frac{\sin \theta}{\sin \theta + \sin (\alpha - \theta)}\right) \quad \text{(III)}$$

$$R_\rho = \frac{L}{2 \sin \theta \left(1 - \frac{\sin \theta}{\sin \theta + \sin (\alpha - \theta)}\right)} + E\left(\frac{K \sin \theta}{\sin K\theta} - 1\right) \quad \text{(IV)}$$

$$r_\rho = R \frac{\sin \theta}{\sin \theta + \sin (\alpha - \theta)} - E\left(\frac{K \sin \theta}{\sin K\theta} - 1\right) \quad \text{(V)}$$

The teeth with thus corrected radii ($L_k$) can be disposed at the positions ($\alpha$) and ($\theta$), i. e. at (C), (D″) and (T), (N″).

In calculating gear wheel, the radius of tooth (L) is taken as a basis for convenience' sake, the radii of engaging circles (R) and (r) are to be corrected thereby. Then, let those values corrected with the correction factor (K) be ($R_k$) and ($r_k$), $$R_k = \frac{R}{K} = \frac{L}{2K \sin \theta \left(1 - \frac{\sin \theta}{\sin \theta + \sin (\alpha - \theta)}\right)}$$

$$r_k = \frac{r}{K} = \frac{R \cdot \sin \theta}{K(\sin \theta + \sin (\alpha - \theta))}$$

$$E_k = R_k - r_k$$

$$= \frac{R}{K}\left(1 - \frac{\sin \theta}{\sin \theta + \sin (\alpha - \theta)}\right)$$

$$= \frac{L}{K 2 \sin \theta \left(1 - \frac{\sin \theta}{\sin \theta + \sin (\alpha - \theta)}\right)} \cdot \left(1 - \frac{\sin \theta}{\sin \theta + \sin (\alpha - \theta)}\right)$$

$$= \frac{L}{2K \sin \theta} = \frac{L}{2K \cdot \sin \frac{360°}{N}} \quad \text{(VI)}$$

$$R_\rho = R_k + E_k\left(\frac{K \cdot \sin \theta}{\sin K\theta} - 1\right)$$

$$= \frac{L}{2K \sin \theta \left(1 - \frac{\sin \theta}{\sin \theta + \sin (\alpha - \theta)}\right)} + \frac{L}{2K \sin \theta}\left(\frac{K \sin \theta}{\sin K\theta} - 1\right)$$

$$= \frac{L}{2K \sin \theta}\left(\frac{\sin \theta + \sin (\alpha - \theta)}{\sin (\alpha - \theta)} + \frac{K \cdot \sin \theta}{\sin K\theta} - 1\right)$$

$$= \frac{L}{2K \cdot \sin \theta}\left(\frac{\sin \theta}{\sin (\alpha - \theta)} + \frac{K \sin \theta}{\sin K\theta}\right)$$

$$= \frac{L}{2K \sin \frac{360°}{N}}\left(\frac{\sin \frac{360°}{N}}{\sin \left(\frac{360°}{n} - \frac{360°}{N}\right)} + \frac{K \sin \frac{360°}{N}}{\sin K \frac{360°}{N}}\right) \quad \text{(VII)}$$

$$r_\rho = r_k - E_k\left(\frac{K \sin \theta}{\sin K\theta} - 1\right)$$

$$= \frac{L}{K 2 \sin \theta \left(1 - \frac{\sin \theta}{\sin \theta + \sin (\alpha - \theta)}\right)} \cdot \frac{\sin \theta}{\sin \theta + \sin (\alpha - \theta)}$$

$$-\frac{L}{2K \sin \theta}\left(\frac{K \sin \theta}{\sin K\theta} - 1\right)$$

$$= \frac{L}{2K \sin \theta}\left(\frac{\sin \theta \, (\sin \theta + \sin (\alpha - \theta))}{(\sin \theta + \sin (\alpha - \theta)) \sin (\alpha - \theta)} - \frac{K \sin \theta}{\sin K\theta} + 1\right)$$

$$= \frac{L}{2K \sin \theta}\left(\frac{\sin \theta}{\sin (\alpha - \theta)} - \frac{K \sin \theta}{\sin K\theta} + 1\right)$$

$$= \frac{L}{2K \sin \frac{360°}{N}}\left(\frac{\sin \frac{360°}{N}}{\sin \left(\frac{360°}{n} - \frac{360°}{N}\right)} - \frac{K \sin \frac{360°}{N}}{\sin K \frac{360°}{N}} + 1\right) \quad \text{(VIII)}$$

Now then, the tooth radius (L) and the teeth-number ($n$) and (N) of inner and outer gear wheels with the correction factor (K) are obtained from the Formulas VI, VII and VIII. Then radii of engaging circles and the eccentricity can be determined and thus the teeth wheel can be constructed thereby.

The present invention relates accordingly to a method of forming internal engaging gear wheels, characterized in that the numerals expressed by the above-mentioned Formulas VI, VII and VIII are taken as $E_k$ or an approximate value thereof, $R_\rho$ or an approximate value thereof and $r_\rho$ or an approximate value thereof, where, in a pair of internally engaging gear wheels, the teeth number of inner and outer tooth-wheels having circular and semi-circular teeth with radii (L) are taken as ($n$) and (N), the correction factor as (K) and the eccentricity as ($E_k$). Depending on the numerical value, the radius of engaging circles can be determined by assuming imaginally teeth where really no tooth is existent. The radius of engaging circles can be changed unsteppedly by keeping the radius of teeth unchanged. Therefore, the coefficient (K) is an extremely adaptable one that can assume any appropriate numerical value. Thus, it enables to give the balance of strength in rate of the radii of teeth and pitch of teeth.

Let the tooth-number for the inner and outer gear wheels be ($n$) and (N) respectively, ($\theta$) and ($\alpha$) will be as follows, as described above $$\alpha = \frac{360°}{n}, \theta = \frac{360°}{N}$$

So $n\alpha = N\theta$. Now if ($a$) is taken as a certain number, the following equality is possible.
Therefore $$\alpha = \frac{360°}{an}, \theta = \frac{360°}{aN}$$

When $a < 1$, $\theta$ and $\alpha$ are enlarged, when $a > 1$, $\theta$ and $\alpha$ are diminished. Then, the Formulae VI, VII and VIII correspond to the case of ($a = 1$). The case ($a < 1$) corresponds to ($a = 0.25$) in Fig. 4, as described hereinafter.

The magnitude of ($a$), which changes ($\alpha$) and ($\theta$) is to be decided in relation to the numerical value of correction factor (K). As the correction difference ($\rho$) increases with the increase of the correction factor (K), the height of the tooth-tip of semi-circular teeth decreases unfavourably. When the magnitude of ($a$) which changes ($\alpha$) and ($\theta$) in order to avoid an extremely large increase of the correction difference ($\rho$), is other than 1, ($\alpha$) and ($\theta$) thus reached do not show positions of really existent teeth. Therefore, the afore-mentioned Formulas VI, VII and VIII are rewritten in general construction formula as follows:

$$E_k = \frac{L}{2K \cdot \sin \frac{360°}{aN}} \quad \text{(VI.1)}$$

$$R_\rho = \frac{L}{2K \sin \frac{360°}{aN}}\left(\frac{\sin \frac{360°}{aN}}{\sin \left(\frac{360°}{an} - \frac{360°}{aN}\right)} + \frac{K \cdot \sin \frac{360°}{aN}}{\sin K \frac{360°}{aN}}\right) \quad \text{(VII.1)}$$

$$r_\rho = \frac{L}{2K \sin \frac{360°}{aN}}\left(\frac{\sin \frac{360°}{aN}}{\sin \left(\frac{360°}{an} - \frac{360°}{aN}\right)} - \frac{K \cdot \sin \frac{360°}{aN}}{\sin K \frac{360°}{aN}} + 1\right) \quad \text{(VIII.1)}$$

As the number of teeth ($n$) and (N) is relatively a small number, in case of $n = 11$ and $N = 12$, for instance, the satisfactory engagement is obtained by multiplying them by two or three to make $n = 22$ and $N = 24$. And for relatively large numbers, for instance in a combination of number of circular teeth $N=78$ and that of semi-circular teeth $n=77$, (N) is safely divided by two, i. e. 39 or divided by three, i. e. 26 in order to obtain smooth engaging.

Several examples embodying the present invention are given as follows:

The Fig. 4 represents an example, where $(N=32)$, $(\theta=45°)$ and $(n=21)$, $(\alpha=46°, 45161)$, $(a=0.25)$ and the coefficient $(K=1.25)$.

Heretofore, the example has been described where one of a pair of gear teeth is constructed circular teeth and the other of semi-circular teeth. But, depending upon the choice of correction-factor, a construction of both wheels with circular teeth or an alternative where one wheel engages with two wheels having different number of teeth simultaneously is possible. Now, an example where both engaging wheels possess circular teeth will be dealt with first. From the Formula 5, it is clear that $L=2(R-r) \sin \theta = 2E \sin \theta$. Putting $\theta=90°$ therein, then $\sin \theta = 1$ $$\therefore L=2E \qquad (14)$$

The number of outer toothed wheel (N) and that of inner toothed wheel (n) are as below: $N=4$, $n=3$. In the tooth having radius (L) as shown in dotted lines in Fig. 5 the semi-circular tooth of inner toothed wheel separate the engaging circular (r) into equal parts at the points (C), (C') and (M). In this case as $L=r$, the circle (r) coincides with the tooth (L) at the point (M). Now, let (L) be divided in two, then circles ($l_1$) and ($l_2$) or circles ($l_1'$) and ($l_2'$) be drawn with centers (M) and (n), then $$L=l_1+l_2 \qquad (15)$$

Three circles similarly drawn around the central points (A), (C) and (C') with radii ($l_1$), ($l_2$) and ($l_2$) come in contact with each other. Now, in the general case, where the dividing angle ($\theta$) is other than $90°$, the Formula 14 is satisfied only when $K\theta=90°$.

Hence, the correction factor (K) for this case is $$K=\frac{90°}{\theta} \qquad (IX.1)$$

Then $$\overline{AC}=2r. \sin \frac{\alpha}{2 \times 2}=L$$

and from the formula 6 $L=2r. \sin (\alpha-\theta)$ $$\therefore \alpha-\theta=\alpha/4 \qquad (16)$$

The above relation is held true only for the combination of $(N=4)$ and $(n=3)$, and for other combinations $$\alpha-\theta \neq \alpha/4$$

Therefore, when both sides of the expression are made equal, by using the correction factor (K), then $$K(\alpha-\theta)=\alpha/4$$

$$K=\frac{\alpha}{4(\alpha-\theta)} \qquad (IX.2)$$

Next, in case $(\theta=45°)$, the factor is obtained $(K=2)$ from the Formula IX.1 or IX.2. Now both sides of the Formula IX.1 be divided by two, then $$\frac{K}{2}=\frac{2}{2}$$

$$=\frac{45°}{\theta} \qquad (17.1)$$

$$\theta=45°$$

Therefore, also for the case of $(\theta=45°)$, the coefficient $(K=1)$. Similarly, from the Formula IX.2, $$\frac{K}{2}=\frac{2}{2}$$

$$=\frac{\alpha}{8(\alpha-\theta)} \qquad (17.2)$$

$$\therefore \alpha=8(\alpha-\theta)$$

$$K=\frac{45°}{\theta}=\frac{\alpha}{8(\alpha-\theta)} \qquad (IX.3)$$

($\theta$) of Formula 17.1 is (½) of Formula IX.1 and ($\alpha$) of Formula 17.2 is (½) of Formula IX.2. Namely, the factor (K) can be made unity by multiplying the tooth-number by 2. The coefficients given by the Formulas IX.1 and IX.2 are for tooth-number ratios below (6):(7) and those given by the Formula IX.3 are for tooth-number ratios above (7):(8). The correction factor for a pair of toothed wheels made of circular teeth is made constant by the tooth-number ratios, and the factor will not be varied even when the tooth-number is multiplied by two or three. And when correction is made by the coefficient of IX.3, the dividing angle for calculating radii of engaging circles ($\alpha$) and ($\theta$) are held unchanged.

The radii ($l_1$) and ($l_2$) of circular teeth in the Formula 15 permit the following three combinations. The diameters for both teeth may vary infinitely, and the three combinations can be formed under $$l_1<l_2, \quad l_1=l_2, \quad l_1>l_2 \qquad (18)$$

The Fig. 6 representing the case where number of teeth $(N=16)$ and $(n=14)$, the factor is determined by Formula IX.3, the radii of engaging circles and eccentricity by Formulas VI, VII and VIII, and the calculated number of teeth are determined $(N=8)$ and $(n=7)$.

The example described in the following is the modification of the two methods explained in the foregoing. In this type of gear wheels, one wheel is combined in the middle between two wheels concentrically arranged in one plane with them in such a way that the former may engage with the latter two, which is shown in Figs. 7 and 8. The radii of engaging circles are calculated in the following two steps (1) and (2).

(1)

$\theta_1$=dividing angle of teeth for outer gear wheel
$\alpha_1$=dividing angle of teeth for the middle gear wheel
$K_1$=correction factor
$R_{1\rho}$=radii of engaging circles for outer gear wheel
$r_{1\rho}$=radii of engaging circles for middle gear wheel
$E_{1k}$=eccentricity between outer and middle toothed wheel
$L_1$=radii of teeth for outer and middle gear wheels or ($l_1+l_2$)

(2)

$\theta_2$=dividing angle of teeth for middle toothed wheel=$\alpha_1$
$\alpha_2$=dividing angle of teeth for inner toothed wheel
$K_2$=correction factor
$R_{2\rho}$=radii of engaging circles for middle toothed wheel=$r_{1\rho}$
$r_{2\rho}$=radii of engaging circles for inner toothed wheel
$E_{2k}$=eccentricity between middle and inner toothed wheels=$E$
$L_2$=radii of teeth for middle and inner toothed wheels or ($l_2+l_3$)

Then $\alpha_1=\theta_2$ and $r_{1\rho}=R_{2\rho}$.

In order that the middle gear wheel is to engage with both outer and inner wheels simultaneously, $$E_{1k}=E_{2k} \qquad (19)$$

and radii of teeth are as below:

$$L_1=2K_1E_{1k} \sin \theta_1 \qquad (20)$$

$$L_2=2K_2E_{2k} \sin \theta_2 \qquad (21)$$

As to the combination of teeth, the teeth of both inner and outer gear wheels are combined with the middle wheel in the following two ways:

|     | Outer gear ($R_{1\rho}$) | Middle gear ($r_{1\rho}$) ($R_{2\rho}$) | Inner gear ($r_{2\rho}$) |
| --- | --- | --- | --- |
| (a) | Semi-circular teeth. | Circular teeth. | Semi-circular teeth. |
| (b) | Circular teeth. | do | Circular teeth. |

Now combination (a) will be explained first. As the teeth of middle gear wheel are common with those of both outer and inner gear wheels, the Formulas 20 and 21 become:

$$2K_1 E_{1k} \sin \theta_1 = 2K_2 E_{2k} \sin \theta_2$$

$$\therefore K_1 = \frac{K_2 \sin \theta_2}{\sin \theta_1} \quad (22)$$

and $$K_2 = \frac{K_1 \sin \theta_1}{\sin \theta_2} \quad (23)$$

The coefficients ($K_1$) and ($K_2$) in Formulas 22 and 23 show the mutual relation between the two coefficients. Either ($K_1$) or ($K_2$) is first decided from the Formula I arbitrarily, then the other is obtained from either Formula 22 or 23.

The correction with ($\rho$) in regard to the engagement is conducted on either outer or inner gear wheel. The results obtained from the Formula VI.1, VII.1 and VIII.1 are corrected as follows. The corrected value bears a mark dash ('). Then $$R_1'\rho = R_1\rho + \frac{R_1\rho - r_1\rho - E_k}{2} \quad (\text{VII.2})$$

$$r_1'\rho = r_1\rho + \frac{R_1\rho - r_1\rho - E_k}{2} \quad (\text{VIII.2})$$

$$R_2'\rho = r_1'\rho \quad (\text{VII.3})$$

$$r_2'\rho = R_1'\rho - (\rho + E_k) = R_2'\rho - E_k\left(2\frac{K_2 \sin \theta_2}{\sin K_2\theta_2} - 1\right) \quad (\text{VIII.3})$$

what is shown in Fig. 7 is an embodiment, where number of teeth for outer, middle and inner gear wheels are 18, 17 and 16 respectively.

In the next place, for combination (b) the teeth of middle gear wheel are common to the teeth of both inner and outer gear wheels similarly as in the case (a). The correcting factor is constant. The radius of the circular tooth is obtained from Formula 15, as follows:

$$L_1 = l_1 + l_2 \quad (24)$$

$$L_2 = l_2 + l_3 \quad (25)$$

and ($l_2$) is common to ($l_1$) and ($l_3$). Then, the eccentricity is obtained from Formulas 20 and 21:

$$E_{1k} = \frac{L_1}{2K_1 \sin \theta_1}$$

$$E_{2k} = \frac{L_2}{2K_2 \sin \theta_2}$$

However, as $E_{1k}$ should be equal to $E_{2k}$, $$L_1 = L_2 \frac{K_1 \sin \theta_1}{K_2 \sin \theta_2} \quad (26)$$

$$L_2 = L_1 \frac{K_2 \sin \theta_2}{K_1 \sin \theta_1} \quad (27)$$

$$l_1 = L_1 - l_2 \quad (28)$$

$$l_3 = L_2 - l_2 \quad (29)$$

For the radius of tooth, first ($l_2$) is arbitrarily determined, and thus ($l_1$) and ($l_3$) are obtained automatically from Formulas 28 and 29. With regard to the engagement, the correction is obtainable from either Formulas VII.2, VIII.2, and VIII.3 similarly as in the case of (a). Fig. 8 shows an example of combination, wherein the radii of engaging circles ($R_1'\rho$), ($r_1'\rho$) and ($r_2'\rho$) are determined by assuming the tooth-number ratios as 11, 10 and 9 for the outer, middle and inner gear wheels and tooth-number are determined as 18, 20 and 22 by multiplying the former numerals by two.

The aforementioned various types of method of forming gear wheels offer engagements of extremely high reduction ratios with small space requirement, even for two or three wheel combinations which are likewise formed under the difference of tooth-number between two gear wheels or difference of ratios of tooth-number difference of ($N - n = 1$), the reduction ratios when applied for a reduction gear being as follows:

reduction ratio of rotation for the outer gear wheel $$= \frac{N-n}{N} = \frac{1}{N}$$

reduction ratio of rotation for the inner gear wheel $$= \frac{N-n}{n} = \frac{1}{n}$$

The sliding friction in those gear wheels is extremely small because of all circular teeth being rollers, and the gear cutting work is also easy, on account of the teeth being circular. Above are the features of the invention.

Moreover, it will be understood that the details herein described may readily be modified by those skilled in the art without departing from the spirit and scope of the invention. It is therefore intended that these details be interpreted as being illustrative and not in a limiting sense.

What I claim is:

1. A special internal engaging gear set, comprising internal engaging gear wheels which are adapted to engage one another, even when the difference of tooth number ratios is unity for both gear wheels, one of said gear wheels comprising circular teeth and the other of said gear wheels comprising semi-circular teeth, the gear wheel formed with semi-circular teeth being adaped to mesh with the other gear wheel formed with circular teeth by altering the rate of tooth pitch to tooth size into the following value $$E_k = \frac{L}{2K \cdot \sin \frac{360°}{aN}}$$

$$R\rho = E_k\left\{\frac{\sin \frac{360°}{aN}}{\sin\left(\frac{360°}{an} - \frac{360°}{aN}\right)} + \frac{K \cdot \sin \frac{360°}{aN}}{\sin K \frac{360°}{aN}}\right\}$$

$$r\rho = E_k\left\{\frac{\sin \frac{360°}{aN}}{\sin\left(\frac{360°}{an} - \frac{360°}{aN}\right)} - \frac{K \cdot \sin \frac{360°}{aN}}{\sin K \frac{360°}{aN}} + 1\right\}$$

or into their approximate value in which the relationship between $R.r$ and $L$ is varied by any arbitrary modifying factor $K$ and a factor $a$ to be determined relatively to the factor $K$ and the modified values of the radii of engaging circles $R$ and $r$ relative to the tooth pitch and $R$ and $r$ and eccentricity $E_k$ respectively, when $R$, $L$ and $E$ have the following relation $$R \cdot \sin \frac{360°}{N} = r\left\{\sin \frac{360°}{N} + \sin\left(\frac{360°}{n} - \frac{360°}{N}\right)\right\}$$

$$L = 2R \cdot \sin \frac{360°}{N}\left\{1 - \frac{\sin \frac{360°}{N}}{\sin \frac{360°}{N} + \sin\left(\frac{360°}{n} - \frac{360°}{N}\right)}\right\}$$

$$E = R - r$$

wherein the radii of the engaging circles of the outer and inner gear wheels are R and $r$, the number of teeth N and $n$, the radii of the circular teeth engaging with each other L and the eccentricity E, and further radii R and $r$ of both outer and inner gear wheels, having circular and semi-circular teeth respectively, possess substantially the aforementioned values.

2. A special internal engaging gear set, comprising internal engaging gear wheels which are adapted to engage one another, even when the difference of tooth numbers is unity for both gear wheels, both wheels having circular teeth, said teeth being adapted to mesh under the relation $L=l_1 l_2$ and $l_1=l_2$ established between the radii $l_1$ and $l_2$ of the engaging circles, by altering the rate of tooth pitch to tooth size into substantially the following value $$E_k = \frac{L}{2k \sin \frac{360°}{N}}$$

$$R\rho = E_k \left\{ \frac{\sin \frac{360°}{N}}{\sin \left( \frac{360°}{n} - \frac{360°}{N} \right)} + \frac{K \sin \frac{360°}{N}}{\sin K \frac{360°}{N}} \right\}$$

$$r\rho = E_k \left\{ \frac{\sin \frac{360°}{N}}{\sin \left( \frac{360°}{n} - \frac{360°}{N} \right)} - \frac{K \sin \frac{360°}{N}}{\sin K \frac{360°}{N}} + 1 \right\}$$

in which the relationship between the radii R and $r$ of the engaging circles and the radius L of the tooth is varied by modifying factor K and the modified values of the radii R and $r$ of engaging circles are $R\rho$ and $r\rho$ and eccentricity $E_k$ respectively, when the internal engaging gear wheels are constructed basing on the relation between R, L and E as described in the following $$R \sin \frac{360°}{N} = r \left\{ \sin \frac{360°}{N} + \sin \left( \frac{360°}{n} - \frac{360°}{N} \right) \right\}$$

$$L = 2R \sin \frac{360°}{N} \left\{ 1 - \frac{\sin \frac{360°}{N}}{\sin \frac{360°}{N} + \sin \left( \frac{360°}{n} - \frac{360°}{N} \right)} \right\}$$

$$E = R - r$$

wherein the radii of the engaging circles of the outer and inner gear wheels are R and $r$, the number of teeth N and $n$, the radii of the circular teeth engaging with each other L and the eccentricity E, and further radii R and $r$ of both outer and inner gear wheels, having circular teeth respectively, possess the aforementioned values or their approximate values, the said outer and inner gear wheels being combined with each other with their central distance or the eccentricity $E_k$, and constructed.

3. A special internal engaging gear set, comprising internal engaging gear wheels and an intermediate gear wheel having circular teeth which is combined and eccentrically interposed between the outer and inner gear wheels which are provided with semi-circular teeth and arranged concentrically, said intermediate gear wheel being adapted to mesh simultaneously with said outer and inner gear wheels under the condition in which the rate of tooth pitch to tooth size is altered into substantially the following value $$E_k = \frac{L}{2k_1 \sin \frac{360°}{aN}} = \frac{L}{2k_2 \sin \frac{360°}{an_1}}$$

$$R_{1\rho} = E_k \left\{ \frac{\sin \frac{360°}{aN}}{\sin \left( \frac{360°}{an_1} - \frac{360°}{aN} \right)} + \frac{K_1 \sin \frac{360°}{aN}}{\sin K_1 \frac{360°}{aN}} \right\}$$

$$r_{1\rho} = E_k \left\{ \frac{\sin \frac{360°}{aN}}{\sin \left( \frac{360°}{an_1} - \frac{360°}{aN} \right)} - \frac{K_1 \sin \frac{360°}{aN}}{\sin K_1 \frac{360°}{aN}} + 1 \right\}$$

$$r_{2\rho} = E_k \left\{ \frac{\sin \frac{360°}{an_1}}{\sin \left( \frac{360°}{an_2} - \frac{360°}{an_1} \right)} - \frac{K_2 \sin \frac{360°}{an_1}}{\sin K_2 \frac{360°}{an_1}} + 1 \right\}$$

in which the radii of the engaging circles of the outer, intermediate and inner gear wheels are $R_{1\rho}$, $r_{1\rho}$ and $r_{2\rho}$ respectively, number of teeth thereof N, $n_1$ and $n_2$, modifying factor of the outer and intermediate or intermediate and inner gear wheels engaging with each other $K_1$ and $K_2$, factor to be determined relatively to the modifying factors $K_1$ and $K_2a$, the radius of the engaging teeth L and eccentricity $E_k$ and the radii $R_1'\rho$, $r_1'\rho$ and $r_2'\rho$ of the actual engaging circles which are obtained from further modification of the radii $R_1$ and $r_1$ are in the following relation $$R_1'\rho = R_{1\rho} + \frac{R_{1\rho} - r_\rho - E_k}{2}$$

$$r_1'\rho = r_{1\rho} + \frac{R_{1\rho} - r_{1\rho} - E_k}{2}$$

$$r_2'\rho = r_1'\rho - E_k \left( 2 \frac{K_2 \sin \frac{360°}{an_1}}{\sin K_2 \frac{360°}{an_1}} - 1 \right)$$

and both outer and inner gear wheels possess semi-circular teeth while the intermediate or middle gear wheel possesses circular teeth and the radii $R_1'\rho$, $r_1'\rho$ and $r_2'\rho$ of engaging circulars of those outer, intermediate and inner gear wheels have respectively the aforementioned values or their approximate values, the intermediate gear wheel being combined with the centers of the aforementioned outer and inner gear wheels, with the distances between the center of the said intermediate gear wheel and the centers respectively of the outer and the inner gear wheels, or the eccentric $E_k$, and constructed.

4. A special internal engaging gear set, comprising internal engaging gear wheels and an intermediate gear wheel having circular teeth and adapted to be combined eccentrically to the outer and inner gear wheels which are provided with circular teeth and concentrically arranged, said intermediate gear wheel being adapted to mesh simultaneously with said outer and inner gear wheels under the conditions in which the rate of tooth pitch to tooth size is altered into substantially the following values $$E_k = \frac{L_1}{2k_1 \sin \frac{360°}{N}} = \frac{L_2}{2k_2 \sin \frac{360°}{n_1}}$$

$$R_{1\rho} = E_k \left\{ \frac{\sin \frac{360°}{n_1}}{\sin \left( \frac{360°}{n_1} - \frac{360°}{N} \right)} + \frac{K_1 \sin \frac{360°}{N}}{\sin K_1 \frac{360°}{N}} \right\}$$

$$r_{1\rho} = E_k \left\{ \frac{\sin \frac{360°}{N}}{\sin \left( \frac{360°}{n_2} - \frac{360°}{n_1} \right)} + \frac{K_1 \sin \frac{360°}{N}}{\sin K_1 \frac{360°}{N}} + 1 \right\}$$

$$r_{2\rho} = E_k \left\{ \frac{\sin \frac{360°}{n_1}}{\sin \left( \frac{360°}{n_2} - \frac{360°}{n_1} \right)} - \frac{K \sin \frac{360°}{n_1}}{\sin K_2 \frac{360°}{n_1}} + 1 \right\}$$

in which the radii of the engaging circles of the outer intermediate and outer gear wheels are $R_{1\rho}$, $r_{1\rho}$ and $r_{2\rho}$ respectively, number of teeth thereof N, $n_1$ and $n_2$, modifying factor of the outer and intermediate or intermediate and inner gear wheels engaging each other K and K, the radius of the engaging teeth $L_1$, and $L_2$, $L_1 = l_1\ l_2$, $L = l_2\ l_3$ and eccentricity $E_k$, and the radii $R_1\rho$, $r_1\rho$ and $r_2'\rho$ of the actual engaging circles which are obtained from further modification of the radii $R_1\rho$ and $r_1\rho$ are in the following relation $$R_1'\rho = R_1\rho + \frac{R_1\rho - r_1\rho - E_k}{2}$$

$$r_1'\rho = r_1\rho + \frac{R_1\rho - r_1\rho - E_k}{2}$$

$$r_2'\rho = r_1'\rho - E_k\left(2\frac{K_2 \sin \frac{360°}{n_1}}{\sin K_2 \frac{360°}{n_1}} - 1\right)$$

and both outer, intermediate and inner gear wheels possess circular teeth and the radii $R_1'\rho$, $r_1'\rho$ and $r_2'\rho$ of engaging circulars of those outer, intermediate and inner gear wheels have respectively the aforementioned values or their approximate values, the intermediate gear wheel being combined with the centers of the aforementioned outer and inner gear wheels, with the distances between the center of the said intermediate gear wheel and the centers respectively of the outer and the inner gear wheels, or the eccentric $E_k$, and constructed.

No references cited.